(12) United States Patent
Nie et al.

(10) Patent No.: US 6,823,898 B1
(45) Date of Patent: Nov. 30, 2004

(54) LOW COST, LOW PERMEATION MULTI-LAYER TUBING

(75) Inventors: Tao Nie, Rochester Hills, MI (US); Andreas Sausner, Rochester Hills, MI (US)

(73) Assignee: ITT Manufacturing Enterprises, Inc., Wilmington, DE (US)

( * ) Notice: Subject to any disclaimer, the term of this patent is extended or adjusted under 35 U.S.C. 154(b) by 38 days.

(21) Appl. No.: 10/161,524

(22) Filed: Jun. 3, 2002

(Under 37 CFR 1.47)

(51) Int. Cl.$^7$ .............................................. F16L 11/00
(52) U.S. Cl. ...................... 138/137; 138/141; 428/36.91
(58) Field of Search ................................. 138/132, 141; 428/36.91

(56) References Cited

U.S. PATENT DOCUMENTS

| | | | |
|---|---|---|---|
| 3,473,087 A | 10/1969 | Slade | 317/2 |
| 3,561,493 A | 2/1971 | Maillard et al. | 138/141 |
| 5,271,974 A * | 12/1993 | Upchurch | 428/34.4 |
| 5,284,184 A | 2/1994 | Noone et al. | 138/121 |
| 5,374,089 A | 12/1994 | Davie et al. | 285/317 |
| 5,383,087 A | 1/1995 | Noone et al. | 361/215 |
| 5,460,771 A | 10/1995 | Mitchell et al. | 264/508 |
| 5,469,892 A | 11/1995 | Noone et al. | 138/121 |
| 5,520,223 A | 5/1996 | Iorio et al. | 138/140 |
| 5,524,673 A | 6/1996 | Noone et al. | 138/103 |
| 5,560,398 A * | 10/1996 | Pfleger | 138/121 |
| 5,566,720 A | 10/1996 | Cheney et al. | 138/137 |
| 5,588,468 A * | 12/1996 | Pfleger | 138/121 |
| 5,590,691 A | 1/1997 | Iorio et al. | 138/146 |
| RE35,527 E | 6/1997 | Martucci | 174/47 |
| 5,638,871 A | 6/1997 | Iorio et al. | 138/146 |
| 5,678,611 A | 10/1997 | Noone et al. | 138/137 |
| 5,718,459 A | 2/1998 | Davie et al. | 285/148.19 |
| 5,743,304 A | 4/1998 | Mitchell et al. | 138/137 |
| 5,771,940 A | 6/1998 | Iorio et al. | 138/146 |
| 5,865,218 A | 2/1999 | Noone et al. | 138/137 |
| 5,867,883 A | 2/1999 | Iorio et al. | 29/460 |
| 5,884,671 A | 3/1999 | Noone et al. | 138/137 |
| 5,884,672 A | 3/1999 | Noone et al. | 138/137 |
| 5,891,373 A | 4/1999 | Hunter | 264/104 |
| 5,996,642 A | 12/1999 | Noone et al. | 138/137 |
| 6,003,562 A | 12/1999 | Iorio et al. | 138/138 |
| 6,053,214 A * | 4/2000 | Sjoberg et al. | 138/134 |
| 6,170,534 B1 | 1/2001 | Noone et al. | 138/137 |
| 6,180,197 B1 | 1/2001 | Nie et al. | 428/36.91 |
| 6,257,281 B1 | 7/2001 | Nie et al. | 138/137 |
| 6,321,795 B1 | 11/2001 | Noone et al. | 138/137 |
| 6,378,562 B1 | 4/2002 | Noone et al. | 138/137 |
| 6,616,191 B2 * | 9/2003 | Beal et al. | 285/21.2 |
| 6,680,093 B1 * | 1/2004 | Ries et al. | 428/36.6 |
| 2003/0035914 A1 * | 2/2003 | Nishi et al. | 428/36.91 |

FOREIGN PATENT DOCUMENTS

| | | |
|---|---|---|
| EP | 1 053 866 A2 | 11/2000 |
| WO | WO 98/01694 | 1/1998 |

* cited by examiner

Primary Examiner—James Hook
(74) Attorney, Agent, or Firm—Young & Basile, P.C.

(57) ABSTRACT

A multi-layer tubing composed of a first layer, a second layer and an intermediate layer interposed between the first layer and the second layer. The first layer contains a first melt-processible thermoplastic such as polyamides, thermoplastic elstomers, and mixtures such materials. The second layer contains a second melt-processible thermoplastic chemically dissimilar form the melt-processible thermoplastic employed in the first layer. The intermediate layer is made of a solidified melt-processible thermoplastic solution which contains the first melt-processible thermoplastic and the second thermoplastic such that the first thermoplastic and the second thermoplastic exist as discretely discernable components dispersed relative to one another in an essentially non-homogenous manner.

16 Claims, 1 Drawing Sheet

LOW COST, LOW PERMEATION MULTI-LAYER TUBING

FIELD OF THE INVENTION

The present invention relates to tubing for conveying fluids therethrough. More particularly, the present invention related to a polymeric tubing which is resistant to permeation by organic compounds. The present invention also relates to tubing adapted for use in a motor vehicle. More particularly, the present invention relates to a multi-layer tube which can be employed for transporting hydrocarbon fluids such as a fuel line or vapor recovery line of a motor vehicle.

BACKGROUND OF THE INVENTION

There exists a need for durable polymeric tubing in a number of fluid handling situations. Depending on the nature of the fluid conveyed through the tube and/or the external environment in which the tube is placed, there is also a need for the polymeric tube to exhibit low permeation to various organic compounds, for example, hydrocarbons.

One area where polymeric tubing can be advantageously employed is in motor vehicles. Single layer fuel lines and vapor return lines of synthetic materials such as polyamides have been proposed and employed in the past. Fuel lines employing such materials generally have lengths of at least several meters. It is important that the line, once installed, not materially change during the length of operation, either by shrinkage, elongation or as a result of the stresses to which the line may be subject during use.

It is also becoming increasingly important that the lines employed be essentially impervious to hydrocarbon emissions due to permeation through the tubing. It is anticipated that future Federal and state regulations will fix the limit for permissible hydrocarbon emissions due to permeation through such lines. For instance, various environmental standards mandate maximum levels for total passive hydrocarbon emission for a vehicle. Levels at or below 2 $g/m^2$ per 24 hour period as calculated by evaporative emission testing methods such as those outlined in Title 13 of the California Code of Regulations, section 1976, proposed amendment of Sep. 26, 1991 can be required. To achieve the desired total vehicle emission levels, a hydrocarbon permeation level for the fuel and vapor lines equal to or below 0.5 $g/m^2$ per 24 hour period would be required. Finally, it is also important that the fuel line employed be essentially impervious to interaction with corrosive materials present in the fuel such as oxidative agents and surfactants as well as additives such as ethanol and methanol.

Various types of tubing have been proposed to address these concerns. In general, the most successful of these have been co-extruded multi-layer tubing. The successful tubing constructions generally have a relatively thick outer layer composed of a material resistant to the exterior environment. The innermost layer is thinner and is composed of a material which is chosen for its ability to block diffusion of organic materials to the outer layer. The materials blocked typically are organic compounds such as aliphatic hydrocarbons, alcohols and other materials present in fuel blends. The materials of choice for the inner layer are polyamides such as Nylon 6, Nylon 6.6, Nylon 11 and Nylon 12.

Alcohol and aromatics in the fluid conveyed through the tube diffuse through the tubing wall at rates different from the aliphatic components. The resulting change in the composition of the liquid in the tubing can change the solubility thresholds of the material in the tube so as, for example, to be able to dissolve monomers and oligomers of tubing materials, such as Nylon 11 and Nylon 12, into the liquid. The presence of copper ions, which can be picked up from the fuel pump, accelerates crystallization of the dissolved monomers and oligomers into a crystalized precipitate. The crystallized precipitate can block filters and fuel injectors and collect to limit travel of the fuel-pump or carburetor float as well as build up on critical control surfaces of the fuel pump.

In U.S. Pat. No. 5,076,329 to Brunnhofer, a five-layer fuel line is proposed which is composed of a thick outer layer formed of Nylon 11 or Nylon 12, a thick intermediate layer of Nylon 6, and a thin intermediate bonding layer between and bonded to the intermediate and outer layers formed of a polyethylene or a polypropylene. On the interior of the tube is an inner layer of Nylon 6 with a thin intermediate solvent-blocking layer formed of an ethylene-vinyl alcohol copolymer transposed between. The use of Nylon 6 in the inner fluid contacting surface is designed to eliminate at least a portion of the monomer and oligomer dissolution which occurs with Nylon 11 or Nylon 12.

In U.S. Pat. No. 5,038,833 to Brunnhofer, a three-layer fuel line is proposed in which a tube is formed having a co-extruded outer wall of Nylon 11 or Nylon 12, an intermediate alcohol barrier wall formed from an ethylene-vinyl alcohol copolymer, and an inner water-blocking wall formed from a polyamide such as Nylon 11 or Nylon 12. In DE 40 06 870, a fuel line is proposed in which an intermediate solvent barrier layer is formed of unmodified Nylon 6.6 used either separately or in combination with blends of polyamide elastomers. The internal layer is also composed of polyamides; preferably modified or unmodified Nylon 6. The outer layer is composed of either Nylon 6 or Nylon 12.

Another tubing designed to be resistant to alcoholic media is disclosed in UK Application Number 2 204 376 A in which a tube is produced which has a thick outer layer composed of polyamides such as Nylon 6 or 6.6 and/or Nylon 11 or 12 which are co-extruded with an alcohol-resistant polyolefin, a co-polymer of propylene and maleic acid.

Heretofore, it has been extremely difficult to obtain satisfactory lamination characteristics between dissimilar polymer layers. Thus all of the multi-layer tubing constructions proposed previously have employed polyamide-based materials in most or all of the multiple layers. Materials employed typically have been polyolefin-based polymers which have a high affinity to polyamide. While many more effective solvent-resistant chemicals exist, their use in this area is limited due to limited elongation properties, strength and compatibility with Nylon 11 and 12.

Thus, it would be desirable to provide an improvement in a tubing material which could be employed in motor vehicles which would be durable and prevent or reduce permeation of organic materials therethrough. It would also be desirable to provide a tubing material which would be essentially nonreactive with components of the liquid being conveyed therein.

SUMMARY OF THE INVENTION

The present invention is a multi-layer tubing for conveying fluids therethrough conveying fluids containing hydrocarbons. The invention can be used in a motor vehicle system to transport fluids such as would be found in a fuel line, a vapor return line or a vapor recovery tube. The multi-layer tube in the present invention comprises an inner layer having an inner surface capable of prolonged exposure to a fluid containing hydrocarbons, the inner layer consisting essentially of an extrudable, melt-processible thermoplastic. The invention further comprises an outer thermoplastic layer and at least one intermediate layer. The intermediate layer is composed of a solidified thermoplastic solution or solidified suspension in which at least one thermoplastic compound is present as a continuously and discretely distributed element in a matrix consisting of a second discrete thermoplastic material.

Other applications of the present invention will become apparent to those skilled in the art when the following description of the best mode contemplated for practicing the invention is read in conjunction with the accompanying drawings.

BRIEF DESCRIPTION OF THE DRAWINGS

The description herein makes reference to the accompanying drawings wherein like reference numerals refer to like parts throughout the several views, and wherein.

DESCRIPTION OF THE PREFERRED EMBODIMENT

Figure 1:
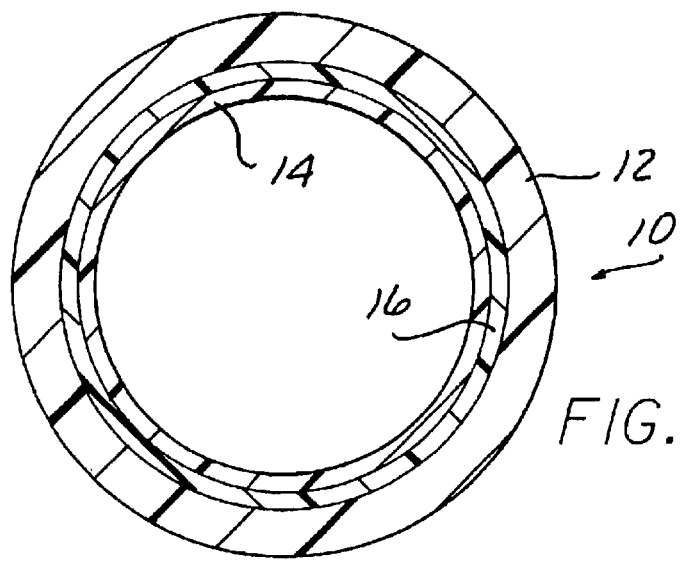
FIG. 1 is a sectional view through multi-layer tubing having three layers according to the present invention.

The present invention is a multi-layer tube 10 which contains an inner or first layer 14, at least one intermediate or second layer 16 and at least one outer or third layer 12. The tubing 10 of the present invention is, preferably, fabricated-by co- extruding the given thermoplastic materials in a suitable co-extrusion process. The tubing 10 may either be co-extruded to a suitable length or may be co-extruded in continuous length and cut to fit the given application subsequently. The tubing 10 of the present invention typically may have an outer diameter up to 50 mm. However, in applications such as fuel lines and vapor recovery systems, outer diameters of up to 63.5 mm (2.5 inches) are preferred. Tubing of the present invention is particularly useful in automotive applications such as for fuel and vapor tubes.

The tube 10 may have any suitable wall thickness desired. However, in automotive systems such as those described herein, wall thicknesses between 0.5 mm and 2.5 mm are generally employed with wall thicknesses of approximately 0.8 mm to approximately 1.5 mm being preferred; and wall thicknesses between about 0.8 mm and about 1.25 mm being most preferred. While it is within the scope of this invention to prepare a tubing material having a plurality of overlaying layers of various thermoplastic materials, the tubing 10 of the present invention generally has a maximum of five layers inclusive of the bonding layers. In the preferred embodiment, the tubing 10 has three, four, or five co-extruded layers.

The tubing 10 of the present invention is a material which is suitable for use in various fluid handling applications such as for use in motor vehicles and comprises an outer layer 12 which is non-reactive with the external environment and can withstand various shocks, vibrational fatigue, and changes in temperature as well as exposure to various corrosive or degradative compounds to which it would be exposed through the normal course of operation. Materials suitable for use in the present invention may be composed of any melt-processible extrudable thermoplastic material which is resistant to environmental rigors associated with the particular tubing application. Ideally, the thermoplastic material is resistant to ultraviolet degradation, extreme changes in heat and exposure to gasoline and its additives. Where appropriate, the material of choice may also exhibit resistance to environmental hazards such as exposure to zinc chloride, and resistance to degradation upon contact with materials such as engine oil and brake fluid.

In automotive applications, it is anticipated that both the outer layer 12, as well as any interior layers bonded thereto, would be suitable for use at an outer service temperature range between about −40° C. and about 125° C., with a range of −20° C. to 120° C. being preferred. The various layers of the tubing 10 are integrally laminated to one another and resistant to delamination throughout the lifetime of the tubing. The tubing 10 thus formed will have a tensile strength of no less than 25 N/mm$^2$ and an elongation value at break of at least 150%. The tubing 10 will have a burst strength at 23° C. of at least 20 bar. The multi-layer tubing 10 of the present invention is sufficiently resistant to exposure to brake fluid, engine oil and peroxides such as those which may be found in gasoline. The multi-layer tube 10 has the capability of withstanding impacts of at least 2 foot-pounds at temperatures below about −40° C. The method for determining impact resistance for automotive tubing as used with respect to the present invention is SAE J2260 (revised November, 1996), Section 7.6.

The multi-layer tube 10 of the present invention has an inner contacting layer 14, an outwardly oriented layer 12 and an intermediate layer 16 interposed between the inner layer 14 and the outwardly oriented layer 12. These layers 12, 14 and 16 are oriented radially with respect to one another. As depicted in FIG. 1, the layers may be contiguous to one another. Alternatively, additional layers may be interposed between the layers enumerated. It is also within the purview of the present invention that the multi-layer tube 10 include additional layers radially interior to the layers enumerated and/or radially exterior to the layers enumerated.

The basic construction of the multi-layer tube 10 of the present invention comprises an intermediate layer having opposed surfaces to which two thermoplastic layers are adhered. The thermoplastic materials of the two respective adhered layers are composed of chemically dissimilar thermoplastic materials. As used herein, the term "chemically dissimilar materials" is defined as two or more melt processible materials capable of melting within a generally similar melt processing range. The term "generally similar melt processing range," as used herein, is taken to mean a temperature range which effectively encompasses the melt processing temperatures of the materials employed to permit extrusion of the two materials. Preferably, in a co-extrusion process, chemically dissimilar thermoplastic materials within the scope of this invention are two or more materials which, when melt processed, will not exhibit significant blending or chemical interaction between the various materials, that is the various materials with exhibit mixture but maintain discrete localized regions of the minor material in the major material. Preferably, chemically dissimilar materials are materials which were heretofore thought to be substantially non-compatible for extrusion melt processing.

As depicted in FIG. 1, the multi-layer tube 10 has an inner layer 14 bonded to the inner surface of the outer layer 12. The outer layer 12 is composed of a melt-processible extrudable thermoplastic material which exhibits suitable resistance to external environmental hazards and degradation for the life of the tube 10. In automotive applications, the material employed in the outer layer 12 will typically exhibit resistance to ultraviolet degradation, extreme changes in heat, exposure to environmental hazards such as zinc chloride as well as degradation upon contact with engine oil and brake fluid.

The thermoplastic material employed in the outer layer 12 is preferably selected from the group consisting of 12-carbon block polyamides, 11-carbon block polyamides, 6-carbon block polyamides, thermoplastic elastomers, and mixtures thereof. Thermoplastic elastomers suitable for use in the present invention include at least one from the group consisting of SANTOPRENE, KRATON and SARLINK. SANTOPRENE® is a thermoplastic rubber commercially available from Advanced elastomer Systems of St. Louis, Mo. KRATON® is a thermoplastic rubber composed of styrene-ethylene/butylene-styrene block copolymer commercially available form Shell Chemical Co. of Houston, Tex. SARLINK is an oil resistant thermoplastic commercially available from Novacor Chemicals of Leominster, Mass.

The materials which compose the outer layer 14 can be present in their unmodified state or can be modified with various plasticizers, flame retardants and the like. The thermoplastic material of choice has an elongation value at break of at least 150% and an ability to withstand impacts of at least 2 foot-pounds at temperatures below about –40° C.

The thermoplastic material employed in the inner layer is a thermoplastic material which is chemically dissimilar to the thermoplastic material employed in the outer layer. Typically, the material of choice is a melt processible thermoplastic material capable of serving as a hydrocarbon barrier in a manner which will prevent significant permeation of aromatic and/or aliphatic components of the conveyed fluid from the tubing interior through the tubing wall to the surrounding environment.

In the preferred embodiment, the thermoplastic material employed in the inner layer 14 of the first embodiment is capable of serving as a hydrocarbon barrier to prevent significant permeation of the aromatic and aliphatic components of gasoline through the outer layer 12 of the tubing 10 and, thus, out to the surrounding environment. It is to be understood that suitable thermoplastic materials for the inner layer 14 will be those resistant to gasoline or other fluid to be conveyed through the tube. It is also to be understood that the barrier nature of the material employed in the inner layer 14 is such that it would provide resistance to permeation into the tubing interior should situations so warrant. The preferred material of choice is one which provides the permeation resistance qualities required and is chemically dissimilar to material employed in the outer layer 12. In automotive applications, the material of choice will be one which provides the tubing construction with a passive hydrocarbon permeation rate at or less than 0.5 g/m² per 24 hour interval as determined by the methods outlined in Title 13 of the California Code of Regulations, Section 1976, amendment of Sep. 26, 1991.

As described herein, the thermoplastic material employed in inner layer 14 is, preferably, a fluoroplastic material. The fluoroplastic material of choice is, preferably selected from a group which includes at least one of polyvinylidine fluoride, polyvinyl fluoride, polychlorotrifluoroethylene, ethylene tetrafluoroethylene copolymers and mixtures thereof, graft copolymers of fluoroplastics from the group which includes at least one of polyvinylidine fluoride, polyvinyl fluoride, polychlorotrifluoroethylene and ethylene tetrafluoroethylene with a suitable fluorine-containing polymers suitable fluorine-containing polymers from at least one of vinylidine fluoride and chlorotrifluoroethane, and mixtures thereof. In the fuel and vapor tube embodiment of the present invention, the fluoroplastic material contains, preferably, at least one of polyvinylidine fluorides, ethylene tetrafluoroethylene copolymers.

In the preferred embodiment, the minimum wall thickness of the fuel contacting inner layer 14 is, preferably, that sufficient to achieve the permeation resistance desired. In general, the inner layer 14 is thinner than the outer layer 12 with the thickness of the outer layer 12 comprising about 50% and about 60% of the total wall thickness of the multi-layer tubing 10. Preferably, the thickness of inner wall 14 is between about 0.01 mm and about 0.2 mm, with a thickness of about 0.05 mm and about 0.2 mm being preferred, and a thickness between about 0.05 mm and about 0.17 mm being most preferred.

The polyvinylidine fluoride (PVDF) material of choice for the inner layer is a polyvinylidine fluoroplastic derived from the thermal dehalogenation of chlorodifluoroethane. Suitable materials are commercially available from various sources under various tradenames.

The tetrafluoroethylene copolymers (ETFE) of choice have a melt temperature between about 270° C. and 560° C. and a specific gravity of 1.7. Ethylene tetrafluoroethylene copolymers employed herein are preferably derived from the copolymerization of ethylene with tetrafluoroethylene. The preferred polymeric material has an ethylene-derived content between about 40% and about 70% and a tetrafluoroethylene content between about 30% and about 60% by total polymer weight with minor amounts of proprietary materials being optionally present. Suitable materials are commercially available under the trade name "TEFZEL", from E.I. duPont de Nemours, Co. of Wilmington, Del.

Polychlorotrifluoroethylene polymeric materials and polyvinyl fluoride polymeric materials are commercially available from various sources. The intermediate layer 16 serves to bond the outer layer 12 to the inner layer 14 to form a secure laminar bond therebetween. The intermediate layer 16 will typically have a thickness sufficient to promote and/or facilitate bonding between the inner and outer layers and, optionally to contribute to permeation resistance. The intermediate layer will preferably have a thickness less than or equal to that of the inner layer 14. The intermediate bonding layer 16 preferably is of sufficient thickness to permit an essentially homogenous bond between the inner layer 14 and outer layer 12. In general, the intermediate bonding layer can be thinner than the other layers and can constitute between about 10% and 50% of the total wall thickness. In the first embodiment the bonding layer 16 is between about 0.01 mm and about 0.25 mm, with a thickness between about 0.05 mm and about 0.20 mm being preferred.

In the preferred embodiment, as depicted in FIG. 1, the intermediate layer 16 is interposed between outer layer 12 and inner layer 14. The intermediate layer 16 has two opposed faces with the respective inner layer 14 and outer layer 12 each in contact with an associated face of the intermediate layer 16.

While the foregoing discussion has been directed to the positioning of an inner barrier layer proximate to, or in contact with, the fluid conveyed through the tube 10, it is within the purview of this particular invention that the radial order of the thermoplastic layers may be inverted depending on the particular use to which the tube 10 is to be put. Thus, in suitable situations, the barrier layer can be oriented toward the exterior to minimize permeation from exterior to interior.

In the present invention, the intermediate layer will he interposed between two chemically dissimilar thermoplastic layers; one layer is composed of a thermoplastic selected from a group which includes at least one of polyamides and thermoplastic elastomers, and one layer composed of a thermoplastic barrier material as outlined previously.

The intermediate layer 16 is composed of a melt processible thermoplastic material to which inner layer 14 and outer layer 12 can adhere. In the present invention, the thermoplastic material employed in the intermediate layer 16 comprises:

a. between about 10% and about 90% by weight of at least one thermoplastic material employed in the outer layer 12; and b. between about 10% and about 90% by weight of at least one thermoplastic material employed in the inner layer 14.

As employed herein, the term "alloy" is defined as a solidified fluid containing two or more thermoplastic materials of choice in which at least one thermoplastic material is dispersed within at least one other thermoplastic material to form a distributed matrix. The solidified fluid may be in the form of a solidified solution in which the distributed matrix is positioned, or a solidified suspension in which the distributed matrix is positioned. Without being bound to any theory, it is believed that the chemical dissimilarity of the respective thermoplastic components contributes to the unique and discrete positioning of one component relative to, and in the presence of, a second component. Such positioning occurs in a manner which maintains discrete identifiable accumulations of minor component in the major component. Such definable concentrations exist in a manner which indicates lack of homogenous blending or appreciable chemical bonding.

In the preferred embodiment, the thermoplastic alloy of the intermediate layer 16 contains between about 10% and about 90% by weight of a melt processible thermoplastic selected from the group consisting of polyamides, thermoplastic elastomers and mixtures thereof and between about 10% and 90% by weight of a melt processible thermoplastic material which is chemically dissimilar to the previously enumerated melt-processible thermoplastic selected from the group consisting of polyamides, thermoplastic elastomers and mixtures thereof. Suitable chemically dissimilar materials used herein are those possession characteristic or characteristics by which a thermoplastic material resists chemical blending with or bonding to a thermoplastic selected from the group which includes at least one of polyamides and thermoplastic elastomers. The material either forms discrete localized bodies within the major compound material or contributes to the formation of discrete such localized bodies within the material.

The melt processible thermoplastic material employed in combination with the polyamide and/or thermoplastic elastomer is preferably a halogenated melt-processible thermoplastic material; more specifically, a melt-processible thermoplastic having at least one halogen functionality associated therewith.

Preferably, the halogenated component contains at least one of chlorine and fluorine. In the preferred embodiment, the halogenated thermoplastic material is a fluoroplastic. Fluoroplastics of choice include at least one of polyvinyldine fluoride, polyvinyl fluoride, polychlorotrifluoroethylene, ethylene tetrafluoroethylene copolymers, graft copolymers of fluoroplastics selected from the group consisting of polyvinylidine fluoride, polyvinyl fluoride, polychlorotrifluoroethylene and ethylene tetrafluoroethylene with a suitable fluorine-containing polymer. Suitable fluorine-containing polymers are preferably at least one of vinylidine fluoride and chlorotrifluoroethane. The fluoroplastic material of choice is preferably at least one of polyvinylidine fluoride and ethylene tetrafluoroethylene.

The thermoplastic selected from the group consisting of polyamides, thermoplastic elastomers and mixtures thereof preferably is a material similar to or compatible with the thermoplastic material employed in the outer layer 12. This thermoplastic material is preferably at least one of the group consisting of polyamide 6, polyamide 6,6, polyamide 11, polyamide 12, KRATON, SARLINK, SANTOPRENE and VICHEM, with a polyamide from at least one of polyamide 6, polyamide 6,6, polyamide 11 and polyamide 12 being most preferred.

Preferably, the thermoplastic material of the intermediate layer 16 contains between about 60% and about 80% by weight fluoropolymer and between about 40% and about 20% by weight polyamide, with between about 65% and about 75% by weight fluoropolymer and between about 35% and about 25% by weight polyamide being most preferred.

The thermoplastic material of the intermediate layer 16 is processed in a melt state to amalgamate the fluoropolymer and the polyamide. The amalgamated material is co-extruded with materials used in forming the other layers of the multi-layer tubing 10. The thermoplastic material employed in the intermediate layer 16 exhibits an affinity to the thermoplastic materials employed in contiguous layers and permits and promotes adhesion for the useful life of the tube.

Without being bound to any theory, it is believed that the affinity is due, in part, to a slight non-homogenous dispersion phenomenon which is demonstrated in the solidified thermoplastic solution. It is believed that melt-processing of thermoplastic amalgem in a manner which produces the tubing of the present invention induces a dispersion gradient over the thickness of the co-extruded layer with a region of greater concentration of minor component proximate to the co-extruded layer composed of that material. Conversely, a region of lower concentration of the minor component is located proximate to the other, opposed co-extruded layer.

Quite unexpectedly, it has been found that the solidified solution maintains significant performance characteristics typically inherent in its major component while the affinity of the polymeric material to the chosen chemically dissimilar thermoplastic material is increased.

The multi-layer tubing 10 of the present invention, as broadly construed, comprises a first layer consisting essentially of a melt processible thermoplastic selected from the group consisting of polyamides, thermoplastic elastomers and mixtures thereof; a second layer consisting essentially of a melt processible thermoplastic which is chemically dissimilar to the material employed in the first layer; and a layer intermediate to the first and second layers consisting essentially of a melt-processible thermoplastic alloy material consisting essentially of a thermoplastic material of the first layer and a thermoplastic material of the second layer wherein the alloy is a solidified thermoplastic solution of at least one thermoplastic of the first layer with a second thermoplastic disposed therein. Preferably, the second thermoplastic is chemically dissimilar to the at least one thermoplastic of the first layer.

The radial order of the first, second and intermediate layers may be that suitable and adapted to tubing function.

While the first embodiment as depicted in FIG. 1 presents a tube 10 with an outwardly lying polyamide/TPO layer, it is within the purview of this invention that the order of layers be reversed provided that the intermediate layer is interposed therebetween.

Figure 2:
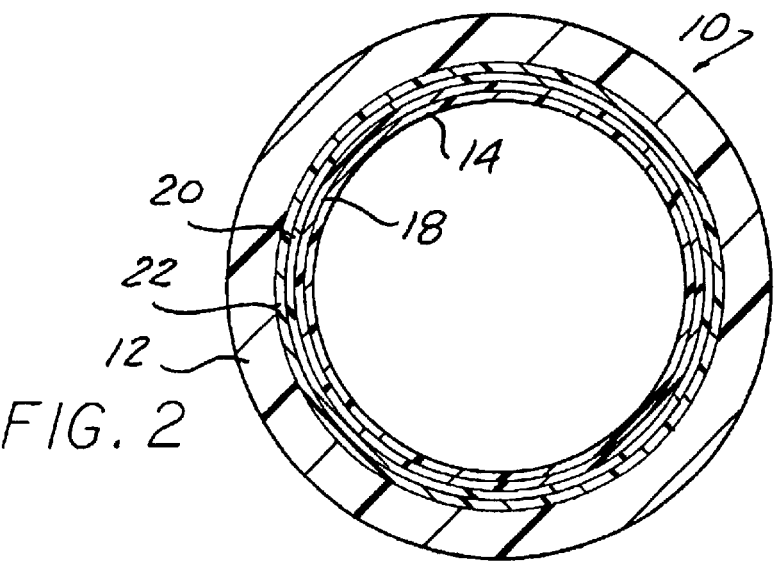
FIG. 2 is a sectional view through multi-layer tubing having five layers according to the present invention.

A variation on the tubing 10 configuration of the present invention is shown in FIG. 2. In this configuration, a five-layer tube is presented in which radially innermost layer 14 is composed of a polyamide/TPO thermoplastic of the type previously enumerated. As depicted in FIG. 2, the material is preferably selected from the group consisting of polyamide 12, polyamide 11, polyamide 6,6 and polyamide 6.

The thermoplastic employed in the inner layer 14 of the second embodiment may be either modified or unmodified. If modified, it is anticipated that the material will contain various plasticizers as are readily known in the art. In the preferred embodiment, the polyamide will contain up to 17% by composition weight plasticizer; with amounts between about 1% and about 13% being preferred.

The inner layer 14 of the second embodiment may have a thickness sufficient to supply strength and chemical resistance properties to the multi-layer tubing. Specifically, the inner layer 14 is of sufficient thickness to impede permeation of aliphatic and aromatic hydrocarbon molecules and migration of those molecules through to the thick outer layer. In the present invention, the inner layer has a wall thickness less than that of the thick outer layer 12. In the preferred embodiment, the inner layer has a wall thickness between about 10% and 25% that of the outer layer; preferably less than between about 0.05 mm and about 0.4 mm; with a wall thickness between about 0.1 mm and about 0.3 mm being preferred.

In the second embodiment, the tubing 10 further includes a barrier layer 20 located radially outward of the inner layer 12. The barrier layer 20 is, preferably, chemically dissimilar in structure and composition from the inner layer 14. The barrier layer 20 is a fuel resistant, permeation resistant, chemical resistant thermoplastic material which is melt processible in normal ranges of extrusion. The thermoplastic material which comprises the barrier layer 20 is preferably a fluoroplastic material from the group which at least one of polyvinylidine fluoride, polyvinyl fluoride, polychlorotrifluoroethylene, ethylene tetrafluoroethylene copolymers, a graft copolymer of the preceding materials together with a fluorine-containing polymer such as copolymers of vinylidine fluoride and chlorotrifluoroethane. It is preferred that the fluoroplastic material include at least one of polyvinilidene fluoride, or ethylene tetrafluoroethylene copolymer.

An intermediate layer 18 is interposed between the inner layer 14 and the barrier layer 20 and co-extruded therewith and is capable of achieving a suitable homogeneous bond between itself and the two respective layers. Intermediate layer 18 is composed of the thermoplastic alloy described previously in conjunction with FIG. 1 and is of sufficient thickness to permit essentially stable connection between the inner layer 14 and the barrier layer 20, respectively. In general, the intermediate bonding layer 18 can be thinner than other more outwardly lying layers and can constitute between about 10% and about 50% of the total wall thickness. As depicted in FIG. 2, the thickness of the intermediate bonding layer 18 is between about 0.01 mm and 0.25 mm with a thickness between about 0.05 mm and about 0.20 mm being preferred.

The five-layer configuration of FIG. 2 also includes an outwardly oriented outer layer 12 composed of a melt-processible thermoplastic which preferably includes at least one of polyamides and thermoplastic elastomers. The preferred polyamide is at least one of polyamide 6, polyamide 6,6, polyamide 11 and polyamide 12. The preferred thermoplastic elastomer is at least one of a material such as KRATON, SANTOPRENE and SARLINK. The inner layer 14 and outer layer 12 may be the same or different as required or desired. In the preferred embodiment, a polyamide such as Nylon 6 is employed.

Interposed between outer layer 12 and barrier layer 20 is an additional intermediate layer 22. The intermediate layer 22 is composed of a melt-processible alloy containing a thermoplastic selected from the group consisting of polyamides, thermoplastic elastomers, and mixtures thereof. The thermoplastic alloy employed in the additional intermediate layer 22 is composed of materials as defined previously. It is to be understood that the thermoplastic alloy employed in the additional intermediate layer can be identical to the employed in intermediate layer 18 or may vary compositionally within the definitions of this invention to more specifically conform to functional requirements and compositional specifics of the outer layer 12.

Figure 3:
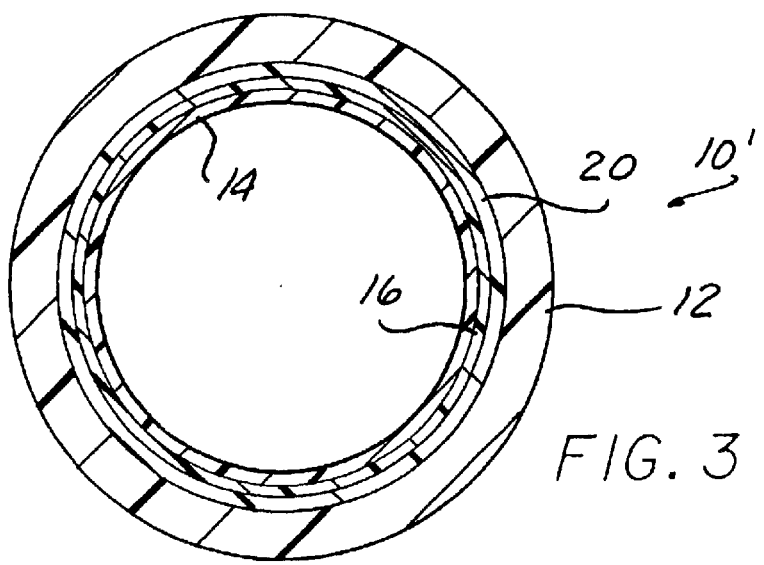
FIG. 3 is a sectional view through multi-layer tubing having four layers according to the present invention.

As depicted in FIG. 3, an inner or first layer 14 is connected to a barrier or second layer 20 by means of the intermediate layer 18. The barrier layer 20 is preferably a permeation resistant, chemical resistant, fuel resistant, non-polyamide thermoplastic material which is melt-processible in normal ranges of extrusion, i.e. about 175° C. to about 250° C. Preferably, the thermoplastic material which comprises the barrier layer 14 is a fluoroplastic selected from the group consisting of polyvinylidine fluoride, polyvinyl fluoride, ethylene tetrafluoroethylene (ETPE) and mixtures thereof. The material can also be a graft copolymer of the preceding materials together with a fluorine-containing polymer such as copolymers of vinylidine fluoride and chlorotrifluoroethane. Suitable material employed would contain between about 60% and about 80% by weight polyvinylidine difluoride. Materials so formed have a melting point between about 200° C. and about 220° C. and a molding temperature between about 210° C. and about 230° C.

In the third embodiment as shown in FIG. 3, the inner layer 14 comprises a material that is a melt-processible extrudable thermoplastic material resistant to extreme changes in heat and exposure to chemical components such as are found in engine oil and brake fluid. The thermoplastic material of choice is, preferably, a thermoplastic material of a group which includes at least one of 12 carbon block polyamides, 11 carbon block polyamides, 6 carbon block polyamides, 6,6 carbon block polyamides and thermoplastic elastomers. A preferred material for the inner layer of the third embodiment is a 6 carbon block polyamide, such as Nylon 6.

In order to accomplish effective lamination of the two dissimilar materials, the tubing 10 of the third embodiment also includes at least one intermediate layer 18 interposed between the inner layer 14 and the barrier layer 20. The intermediate layer 16 is co-extruded with the inner layer 14 and the barrier layer 20 and is capable of achieving a suitable homogenous bond between itself and the two respective layers. The thermoplastic material employed in the intermediate layer 18 is a thermoplastic alloy as disclosed previously herein.

The outer layer 12 of the construction depicted in FIG. 3, in general, has a thickness greater than the inner layer 14 of the barrier layer 20. The outer layer 12 is between about 50% and about 60% of the total wall thickness of the multi-layer tubing 10. The outer layer 12 is composed of a material resistant to the exterior environment, including extreme heat changes, ultraviolet degradation, exposure to zinc chloride, and exposure to engine oil and brake fluid In the third embodiment, a preferred material for the outer layer 12 is a 12 carbon block polyamide, such as Nylon 12. As depicted in FIG. 3, the barrier layer is composed of a melt processible fluoropolymer specifically formulated to provide an affinity to the Nylon 12 material employed in the outer layer 12 to facilitate direct bonding of the barrier layer to the Nylon 12 layer. Suitable materials are commercially available from various sources. One such suitable material is a thermoplastic polyvinylidine difluoride (PVDF) material. The material of choice may have suitable adhesion-promoting groups chemically grafted thereto. Suitable Nylon 12 materials are commercially available from various sources. Other materials which can be suitably employed include materials such as materials composed of 1-propene,1,1,2,3,3,3-hexafluoro-1,1-difluoroethene polymer. Its melting point is 155°–160° C. Its specific gravity is 1.77–1.79 at 23° C. It appears translucent and has no odor.

In certain instances, it is that such materials will be present as a hexafluoropropylene-vinylidine fluoride copolymer, CAS No. 9011-17-0. The melting point is between about 155° C. and about 160° C. It is not soluble in water. It appears as translucent pellets having no odor. It is stable under 300° C.

Other materials which may be employed include nylon-vinylidene fluoride-chlorotrifluoroethylene copolymers such as those containing 20–40% vinylidene fluoride-chlorotrifluoroethylene copolymer, 20–40% polyvinylidene fluoride and 20–40% Nylon 12. In a 40/30/30 composition of nylon, vinylidine fluoride, chlorotrifluoroethylene respectively, the material has a specific gravity of 1.45 at 23° C., a melting point of 173° C. and a mold temperature of 220° F. The material has an elongation at break of 400% or greater and a tensile strength of 400 Kgf/cm$^2$.

Materials such as ethylene tetrafluoroethylene fluoropolymers will typically have a melting point between 255° C. and 280° C. as determined by ASTM method DTA D3418. The specific gravity for such material is between 1.70 and 1.72 as determined by ASTM method D792. Impact strength for the material at −65° F. is between 2.0 ft-lbs/inch and 3.5 ft-lbs/inch as determined by ASTM method D256, commonly referred to as Notched Izod Impact Strength. The hardness durometer as determined by ASTM method D2240 is typically D70. Tensile strength at 73° F. is between 5,500 psi and 7,000 psi. Ultimate elongation at break is typically between 150% and 300%, depending on the grade as determined by ASTM method D638.

As depicted in FIG. 3, the barrier layer 20 is maintained at a thickness suitable to achieve a hydrocarbon permeation value for the resulting tubing 10 of the present invention no greater than about 0.5 g/m$^2$ in a 24 hour interval. Preferably, the barrier layer 20 has a thickness between about 10% and about 20% of the outer layer 12. Preferably, the barrier layer 20 has a thickness between about 0.15 mm and about 0.25 mm with a thickness of about 0.18 mm to about 0.22 mm being preferred.

In the first embodiment, the intermediate layer 16 is of sufficient thickness to permit an essentially homogeneous bond between the inner layer 14 and outer layer 12. In general, the intermediate bonding layer 16 can be thinner than the other two layers and can constitute between about 10% and about 20% of the total wall thickness of the multi-layer tube 10. In the preferred embodiment, the thickness of the intermediate bonding layer 16 is between about 0.01 mm and about 0.2 mm with a thickness between about 0.05 mm and about 0.2 mm being preferred; and a thickness between about 0.05 mm and about 0.15 mm being most preferred.

In the second and third embodiment, it is preferred that the barrier layer 20 and the bonding layers 18, 22, be maintained at the minimum thickness necessary to prevent permeation of the fuel through the tubing 10. In general, the bonding layers 18, 22 can be thinner than the other layers and can constitute between about 10% and about 20% of the total wall thickness of the tubing 10. In the preferred embodiment, the intermediate bonding layers are between about 0.01 mm and about 0.2 mm with a thickness between about 0.05 mm and about 0.2 mm being preferred; and a thickness between about 0.05 mm and about 0.15 mm being most preferred.

In each of the embodiments, the outer layer 12 has a wall thickness sufficient to provide suitable strength and endurance to the multi-layer tubing 10 of the present invention. Generally, in applications involving automotive vehicles, the outer layer 12 comprises between about 50% and about 70% of the total wall thickness. In general, the outer layer 12 has a wall thickness between about 0.6 mm and about 0.9 mm; with a preferred wall thickness between about 0.7 mm and about 0.8 mm, and a most preferred wall thickness between about 0.7 mm and about 0.75 mm. In the third embodiment, the Nylon 12 outer layer 12 preferably has a wall thickness between about 0.5 mm and about 0.8 mm with a preferred range being between about 0.6 mm and about 0.75 mm. As indicated previously, the material is extruded by conventional co-extrusion methods to any continuous length desired.

The following is a brief description of the various exemplary, commercially available compounds described hereinabove. It is to be understood that these are examples of suitable compounds for illustrative purposes. Thus, it is to be further understood that other suitable compounds are contemplated and are within the scope of the present invention.

SANTOPRENE®, commercially available from Advanced Elastomer Systems, L.P. of St. Louis, Mo. is a thermoplastic rubber FR grade. Aside from the thermoplastic rubber, it also contains antimony trioxide flame retardant, and may contain carbon black, CAS No. 1333-86-4. SANTOPRENE® thermoplastic rubber may react with strong oxidizing chemicals, and also reacts with acetyl resins at temperatures of 425° F. and above, producing decomposition of the acetyl resins, and formaldehyde as a decomposition product. Decomposition of halogenated polymers and phenolic resins may also be accelerated when they are in contact with SANTOPRENE® thermoplastic rubber at processing temperatures. Physical characteristics of SANTOPRENE® include a slightly rubber-like odor, and the appearance of black or natural (colorable) pellets. It is thermally stable to 500° F. The flash ignition temperature is greater than 650° F. by method ASTM-D 1929-77, and by the same method, self-ignition temperature is above 700° F. The typical specific gravity is 0.90 to 1.28. The material has various hardnesses which are suitable in the present invention, however, in the preferred embodiment, the SANTOPRENE® thermoplastic rubber having an 80 Shore A hardness is utilized. The SANTOPRENE® thermoplastic rubber is designed to offer fluid and oil resistance equivalent to that of conventional thermoset rubbers such as neoprene. The resistance of the SANTOPRENE® rubber grades to oils can be classified by using the SAE J200/ASTM D2000 standard classification system for rubber.

KRATON®, commercially available from Shell Chemical Co. of Houston, Tex., is a thermoplastic rubber having a specific gravity of 0.90 to 1.90 and a hardness of 15A to 60D. The tensile strength is up to 2,500 psi. The elongation is up to 750% and the tear strength is up to 750 pli (130 kN/m). The flex modulus is 750 to 100,000 psi. The service temperature is −70° C. to 150° C. The ozone resistance is excellent, UV resistance is excellent, fluid resistance is fair to excellent, and flame resistance is fair to excellent.

SARLINK is a thermoplastic elastomer commercially available from Novacor Chemicals Inc. of Leominster, Mass. The specific gravity ranges from 1.13 to 1.22. The modulus at 100% ranges between 260 and 570 psi. The tensile strength ranges between 780 and 2,060 psi. The ultimate elongation ranges between about 345 and about 395%. The tear strength ranges between about 81 and about 196 pli. The tension set ranges between about 4 and 6%. It has excellent fluid resistance to acids and alkalis, aqueous solutions, organic solvents, petroleum oils and fuels, automotive fluids such as automatic transmission, power steering, etc. and industrial fluids. It has fair fluid resistance to automotive fluids such as hydraulic brake, lithium grease, antifreeze, etc. and poor resistance to organic solvents. The SARLINK product is a solid, black pellet material with a mildly pungent odor. It is insoluble in water at 20° C.

While preferred embodiments, forms and arrangements of parts of the invention have been described in detail, it will be apparent to those skilled in the art that the disclosed embodiments may be modified. Therefore, the foregoing description is to be considered exemplary rather than limiting, and the true scope of the invention is that defined in the following claims.

What is claimed is:

1. A multi-layer tubing comprising:
    a first layer composed of a first melt-processible thermoplastic, the first melt-processible thermoplastic selected from the group consisting of polyamides, thermoplastic elastomers, and mixtures thereof;
    a second layer composed of a second melt-processible thermoplastic wherein the second melt-processible thermoplastic is chemically dissimilar form the first melt-processible thermoplastic; and
    an intermediate layer having a radial thickness, the intermediate layer interposed between the first layer and the second layer, the intermediate layer composed of a solidified melt-processible thermoplastic solution consisting essentially of the first melt-processible thermoplastic, and the second melt-processible thermoplastic, wherein the first thermoplastic and the second thermoplastic exist as discretely discernable components dispersed relative to one another in an essentially non-homogenous manner, wherein the solidified melt-processible thermoplastic solution evidences a dispersion gradient over the radial thickness of the intermediate layer with a region of greater concentration of the first thermoplastic proximate to the first layer.

2. The multi-layer tubing of claim 1 wherein the polyamide of the first melt-processible thermoplastic is selected form the group consisting of polyamide 6, polyamide 6,6, polyamide 11, polyamide 12, and mixtures thereof.

3. The multi-layer tubing of claim 2 wherein the second melt-processible thermoplastic is a fluoroplastic.

4. The multi-layer tubing of claim 3 wherein the fluoroplastic is selected from the group consisting of polyvinylidine fluoride, polyvinyl fluoride, polychlorotrifluoroethylene, ethylene tetrafluoroethylene copolymers and mixtures thereof.

5. The multi-layer tubing of claim 4 wherein the thermoplastic is selected from the group consisting of ethylene tetrafluoroethylene copolymers, polyvinylidine fluoride, polyvinyl fluoride and mixtures thereof.

6. The multi-layer tubing of claim 3 wherein the thermoplastic material employed in the intermediate layer consists essentially of;
    between about 10% and about 90% by weight of the fluoroplastic; and
    between about 10% and about 90% by weight of the polyamide.

7. The multi-layer tubing of claim 6 wherein the fluoroplastic is between about 60% and about 70% by weight and the polyamide is between about 30% and about 40% by weight.

8. The multi-layer tubing of claim 7 wherein the polyamide thermoplastic is dispersed within the fluoroplastic in the intermediate layer in localized regions in a non-homogenous manner.

9. The multi-layer tubing of claim 1 wherein the first layer is composed of a polyamide and the first melt-processible thermoplastic is polyamide present as localized polyamide regions that exhibit a concentration gradient through radial thickness of the intermediate layer and wherein a region of greater polyamide concentration is proximate to the first layer.

10. The multi-layer tubing comprising:
    a first layer composed of a first melt-processible thermoplastic, the first melt-processible thermoplastic selected from the group consisting of polyamides, thermoplastic elastomers, and mixtures thereof;
    a second layer composed of a second melt-processible thermoplastic, the second thermoplastic being chemically dissimilar form the first melt-processible thermoplastic and being selected form the group consisting of polytetrafluoroethylene, perfluorinated ethylene-propylene, perfluoroalkoxy fluorocarbon resin, tetrafluoroethylene-perfluorovinyl ether, ethylene tetrafluoroethylene (ETFE), the copolymer of tetrafluoroethylene and hexafluoropropylene, polyvinylidene fluoride (PVDF), polyvinyl fluoride copolymers of vinylidene difluoride and chlorotrifluoroethane copolymerized with polyvinylidene fluoride, copolymers of vinylidene difluoride and chlorofluoroethane copolymer with polyvinyl fluoride, polychlorotrifluoroethylene, a graft copolymer with a fluorine-containing polymer such as copolymer of vinylidene fluoride and chlorotrifluoroethane, a copolymer of a vinyl fluoride and chlorotrifluoroethylene, and mixtures thereof; and
    an intermediate layer having a radial thickness, the intermediate layer interposed between the first layer and the second layer, the intermediate layer composed of a solidified melt-processible thermoplastic solution consisting essentially of the first melt-processible, and the second melt-processible thermoplastic, wherein the first thermoplastic and the second thermoplastic exist as discretely discernable components dispersed relative to one another in an essentially non-homogenous manner, wherein the solidified melt-processible thermoplastic solution evidences a dispersion gradient over the thickness of the intermediate layer with a region of greater concentration proximate to the first layer.

11. The multi-layer tubing as defined in claim 10 wherein the second layer is made of a fluoropolymer material selected from the group consisting of polyvinylidene fluoride, ethylene tetrafluoroethylene, and mixtures thereof.

12. The multi-layer tubing of claim 10 wherein the first layer is made from a material selected from the group consisting of 12 carbon block polyamides, 11 carbon block polyamides, 6 carbon block polyamides, and mixtures thereof.

13. The multi-layer tubing of claim 12 wherein the first layer is a 6 carbon block polyamide.

14. The multi-layer tubing of claim 13 wherein the melt-processible thermoplastic of the intermediate layer comprises:
- between about 65% and about 75% by weight of a fluoroplastic selected from the group consisting of ethylene tetrafluoroethylene, polyvinylidine difluoride and mixtures thereof; and
- between about 25% and about 35% by weight of a polyamide selected from the group corking of polyamide 6, polyamide 11, polyamide 12 and mixtures thereof.

15. The multi-layer tubing of claim 14 wherein the polyamide thermoplastic is dispersed within the fluoroplastic in the intermediate layer in localized regions in a non-homogenous manner.

16. The multi-layer tubing of claim 10 wherein the first layer is composed of a polyamide and the first melt-processible thermoplastic in the intermediate layer is a polyamide present as localized polyamide regions that exhibit a concentration gradient through radial thickness of the intermediate layer and wherein a region of greater polyamide concentration is proximate to the first layer.

* * * * *